US011901557B2

(12) United States Patent
Kang et al.

(10) Patent No.: US 11,901,557 B2
(45) Date of Patent: Feb. 13, 2024

(54) NEGATIVE ELECTRODE ACTIVE MATERIAL, METHOD FOR PREPARING SAME, SECONDARY BATTERY AND APPARATUS INCLUDING THE SECONDARY BATTERY

(71) Applicant: Contemporary Amperex Technology Co., Limited, Ningde (CN)

(72) Inventors: Meng Kang, Ningde (CN); Xiaobin Dong, Ningde (CN); Jiazheng Wang, Ningde (CN); Libing He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 166 days.

(21) Appl. No.: 17/547,277

(22) Filed: Dec. 10, 2021

(65) Prior Publication Data

US 2022/0102711 A1    Mar. 31, 2022

Related U.S. Application Data

(63) Continuation of application No. PCT/CN2020/088415, filed on Apr. 30, 2020.

(51) Int. Cl.
| | |
|---|---|
| *H01M 4/587* | (2010.01) |
| *H01M 4/04* | (2006.01) |
| *H01M 4/36* | (2006.01) |
| *H01M 4/505* | (2010.01) |
| *H01M 4/525* | (2010.01) |
| *H01M 4/133* | (2010.01) |
| *H01M 4/02* | (2006.01) |

(52) U.S. Cl.
CPC ......... *H01M 4/587* (2013.01); *H01M 4/0404* (2013.01); *H01M 4/133* (2013.01); *H01M 4/366* (2013.01); *H01M 4/505* (2013.01); *H01M 4/525* (2013.01); *H01M 2004/021* (2013.01); *H01M 2004/027* (2013.01); *H01M 2004/028* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2005/0221185 A1* | 10/2005 | Sakata | ............... | H01M 4/133 |
| | | | | 429/232 |
| 2009/0242830 A1* | 10/2009 | Mao | ................. | H01M 4/366 |
| | | | | 252/182.1 |
| 2017/0033360 A1* | 2/2017 | Michaud | ........... | H01M 4/366 |

FOREIGN PATENT DOCUMENTS

| | | | |
|---|---|---|---|
| CN | 101478044 A | 7/2009 | |
| CN | 103746114 A | 4/2014 | |
| CN | 107706387 A | 2/2018 | |
| CN | 109704323 A | 5/2019 | |
| CN | 111082129 A | 4/2020 | |
| EP | 955684 A1 * | 11/1999 | ............ C01B 31/04 |
| EP | 2280437 A1 * | 2/2011 | ........... C04B 35/522 |
| EP | 3246974 A1 | 11/2017 | |
| JP | 2011216241 A | 10/2011 | |
| JP | 2017525083 A | 8/2017 | |
| JP | 2018006072 A | 1/2018 | |
| JP | 2018116929 A | 7/2018 | |
| JP | 2020043069 A | 3/2020 | |
| KR | 1020050100505 A | 10/2005 | |
| WO | 2019189800 A1 | 10/2019 | |

OTHER PUBLICATIONS www.espacent.com machine translation of CN107706387A1. (Year: 2018).*
Mastersizer 3000 User Manual—182 pages (Year: 2013).*
The First Office Action for Japanese Application No. 2022-532628, dated May 22, 2023, 8 pages.
The First Office Action for Korean Application No. 10-2022-7018084, dated May 1, 2023, 18 pages.
The International search report for PCT Application No. PCT/CN2020/088415, dated Feb. 5, 2021, 12 pages.
The extended European search report for European Application No. 20932960.6, dated Jul. 26, 2022, 10 pages.
Database WPI Week 201820 Thomson Scientific, London, GB; AN 2018-15926P, XP002807074, 3 pages.
Database WPI Week 201952 Thomson Scientific, London, GB; AN 2019-42322V, XP002807075, 2 pages.
Mastersizer 3000 user manual, dated Aug. 21, 2013, 182 pages.

* cited by examiner

*Primary Examiner* — Gregg Cantelmo
(74) *Attorney, Agent, or Firm* — East IP P.C.

(57) ABSTRACT

The present application discloses a negative electrode active material and a method for preparing the same, a secondary battery, and an apparatus including the secondary battery. The negative electrode active material includes a core and a coating layer covering the surface of the core, the core includes artificial graphite, the coating layer includes amorphous carbon, and the particle size uniformity of the negative electrode active material is from 0.25 to 0.45.

15 Claims, 3 Drawing Sheets

NEGATIVE ELECTRODE ACTIVE MATERIAL, METHOD FOR PREPARING SAME, SECONDARY BATTERY AND APPARATUS INCLUDING THE SECONDARY BATTERY

CROSS-REFERENCE TO RELATED APPLICATION

This application is a continuation of International Application No. PCT/CN2020/088415, filed on Apr. 30, 2020, which is incorporated herein by reference in its entirety.

TECHNICAL FIELD

This application belongs to the technical field of secondary batteries, and specifically relates to a negative electrode active material, a method for preparing the same, and to a secondary battery and an apparatus including the secondary battery.

BACKGROUND

Secondary batteries have been widely used in the new energy industry, for their advantages of high energy density, long cycle life, pollution-free, memory effect-free, etc. For example, with the development of new energy vehicles, the demand for secondary batteries will grow sharply.

However, since secondary batteries have long charging time, which aggravates the user's anxiety about mileage, in turn affects the user's actual experience. For this reason, the long charging time of the secondary batteries limits the rapid popularization of new energy vehicles. Therefore, how to improve the fast charging performance of the secondary batteries has become an urgent technical problem to be solved.

SUMMARY

In order to solve the above technical problem, a first aspect of the present application provides a negative electrode active material, including a core and a coating layer covering a surface of the core, wherein the core includes artificial graphite, the coating layer includes amorphous carbon, the negative electrode active material has a particle size uniformity of from 0.25 to 0.45.

A second aspect of the present application provides a secondary battery including a negative electrode plate, wherein the negative electrode plate includes a negative electrode current collector and a negative electrode film layer, including a negative electrode active material, arranged on at least one surface of the negative electrode current collector, and wherein the negative electrode active material includes the negative electrode active material according to the first aspect of the present application.

A third aspect of the present application provides an apparatus, including the secondary battery according to the second aspect of the present application.

A fourth aspect of the present application provides a method for preparing a negative electrode active material, comprising the following steps:

a) providing a coke raw material, wherein the coke raw material has a volume average particle size $D_v50$ of from 6 μm to 12 μm, and the coke raw material has a volatile content $C_1$ satisfying $1\% \leq C_1 \leq 12\%$, and preferably, $5\% \leq C_1 \leq 9\%$;

b) shaping and grading the coke raw material to obtain a precursor, wherein the precursor has a particle size uniformity $U_1$ satisfying $0.2 \leq U_1 \leq 0.5$;

c) granulating the precursor, during which a binder is added in an amount of $C_2$, wherein $C_1$, $C_2$ and $U_1$ satisfy $21\% \leq (C_1+C_2)/U_1 \times 100\% \leq 50\%$, and preferably, $31\% \leq (C_1+C_2)/U_1 \times 100\% \leq 35\%$;

d) graphitizing the granulated product at a temperature of from 2800° C. to 3200° C. to obtain an artificial graphite, wherein the artificial graphite has a particle size uniformity $U_2$ satisfying $0.22 \leq U_2 \leq 0.48$; and e) coating the artificial graphite with an organic carbon source, performing heat treatment to form an amorphous carbon coating layer on at least a part of the surface of the artificial graphite, to obtain the negative electrode active material, wherein the organic carbon source added during forming the coating layer has an amount $C_3$, and wherein $C_3$, $C_1$, $C_2$ and $U_2$ satisfy $20\% \leq (C_1+C_2+C_3)/U_2 \times 100\% \leq 55\%$, and $1.5\% \leq C_3 \times$ carbon residue rate $\leq 2.5\%$; and wherein the particle size uniformity of the negative electrode active material is from 0.25 to 0.45.

As compared with the prior art, the present application has at least the following beneficial effects:

The negative electrode active material as provided in the present application includes a core and a coating layer covering a surface of the core, wherein the core includes artificial graphite, the coating layer includes amorphous carbon, and the particle size uniformity of the negative electrode active material is controlled within specific ranges. Thus, the secondary battery using the negative electrode active material as provided in the present application has a relatively high energy density and simultaneously has fast charging performance. It is more preferable that the battery can have longer cycle life at the same time. It is particularly preferable that the battery can also have a longer cycle life and higher high-temperature storage performance at the same time. The apparatus according to the present application includes the secondary battery provided according to the present application, and thus has at least advantages identical to those of the secondary battery.

DESCRIPTION OF THE DRAWINGS

In order to explain the technical solutions of the embodiments of the present application more clearly, the following will briefly introduce the drawings that need to be used in the embodiments of the present application. Apparently, the drawings described below are only some examples of the present application. A person of ordinary skill in the art can obtain other drawings based on the drawings without creative work.

DETAILED DESCRIPTION

In order to make the objectives, technical solutions and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range described with the term "above" or "below" includes the lower or upper limit itself, and "more" in "one or more" means two and more than two.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Negative Electrode Active Material

An embodiment of the first aspect of the present application provides a negative electrode active material, comprising a core and a coating layer covering a surface of the core, wherein the core comprises artificial graphite, the coating layer comprises amorphous carbon, the particle size uniformity of the negative electrode active material is from 0.25 to 0.45.

The particle size uniformity of the negative electrode active material has a meaning well-known in the art, and can be tested by methods well-known in the art. In particular, the uniformity of the particle size of the negative electrode active material can characterize the dispersion degree of the particle size of all the particles in the negative electrode active material from the volume average particle size ($D_v50$) of the negative electrode active material, and the dispersion degree reflects the particle size distribution uniformity of the negative electrode active material.

In secondary batteries, the liquid phase conductivity and electronic conductivity of the active ions in the plates may directly affect the fast charging performance of the battery. Through a lot of research the inventors have found that under the condition that a negative electrode active material comprises a core and a coating layer covering a surface of the core, wherein the core comprises artificial graphite, the coating layer comprises amorphous carbon, and the particle size uniformity of the negative electrode active material is from 0.25 to 0.45, then the negative electrode plate using such negative electrode active material can obtain compact particle accumulation and higher compaction density, and also can have shortened liquid phase transmission path for transmitting active ions in the negative electrode film and have reduced liquid phase conduction resistance to active ions, moreover, there are larger contact areas among the negative electrode active material particles and between the negative electrode active material particles and the negative electrode current collector, so that the negative electrode plate has higher solid-phase diffusion capacity of active ions and electronic conduction capacity of electrons. Therefore, the secondary battery can have higher energy density and simultaneously have significantly improved fast charging performance.

Further, in the negative electrode plate using the negative electrode active material, adhesion is better among the negative electrode active material particles and between the negative electrode film layer and the negative electrode current collector; thus, the negative electrode plate is not prone to be subjected to risk of film peeling and dust generating. As a result, the battery can have a longer cycle life. Particularly, in the negative electrode film layer, the unobstructed pores and the good pore distribution uniformity are beneficial for the negative electrode film layer to be fully and uniformly impregnated with the electrolyte solution. Therefore, the fast charging performance and as well the high temperature storage performance of the battery can be improved.

In the negative electrode active material of the present application, the particle size uniformity of the negative electrode active material may be from 0.26 to 0.43, from 0.28 to 0.45, from 0.3 to 0.45, from 0.32 to 0.4, from 0.3 to 0.38, from 0.31 to 0.38, from 0.32 to 0.37, from 0.3 to 0.36, or from 0.33 to 0.39, etc. In particular, the particle size uniformity of the negative electrode active material may be 0.26, 0.28, 0.31, 0.33, 0.35, 0.38, 0.4, or 0.42, etc. In some preferred embodiments, the particle size uniformity of the negative electrode active material may be from 0.3 to 0.4, and more preferably from 0.31 to 0.38. Under the condition that the particle size uniformity of the negative electrode active material falls within an appropriate range, it can better balance the higher energy density, fast charging performance, cycle performance and high-temperature storage performance of the secondary battery.

In the negative electrode active material of the present application, the coating layer comprises amorphous carbon, and thus the active ions can diffuse fast in the negative electrode active material particles, so as to improve the rapid charging capability of the material. At the same time, the amorphous carbon coating layer can protect the core, and thus the peeling of the graphite layer on the core caused by the co-intercalation of the solvent is greatly reduced. As a result, the negative electrode active material has higher structural stability, and thus the negative electrode active material have higher capacity and cycle life.

In some preferred embodiments, 80% to 100% of the surface of the core may be covered with the amorphous carbon coating layer. More preferably, 90% to 100% of the surface of the core may be covered with the amorphous carbon coating layer.

The amorphous carbon coating layer may be formed by carbonization of an organic carbon source. For example, the organic carbon source may be selected from high molecular polymers, such as coal pitch, petroleum pitch, phenolic resin, and coconut shell.

The inventors has found through in-depth research that, under the condition that the negative electrode active material of the present application satisfies the above conditions, and under the condition that it satisfies one or more of the following parameters, the performance of the secondary battery can be further improved.

In some preferred embodiments, the particle size specific surface area of the negative electrode active material is from 0.3 m²/g to 0.65 m²/g. For example, the particle size specific surface area of the negative electrode active material may be 0.35 m²/g, 0.38 m²/g, 0.42 m²/g, 0.45 m²/g, 0.48 m²/g, 0.5 m²/g, 0.52 m²/g, 0.56 m²/g, 0.58 m²/g or 0.6 m²/g. More preferably, the particle size specific surface area of the negative electrode active material is from 0.4 m²/g to 0.55 m²/g.

It should be noted that the "particle size specific surface area" of the negative electrode active material of the present application is not the same as the "specific surface area" of the negative electrode active material in the prior art. At present, the specific surface area of the negative electrode active material in the industry is mostly obtained by the gas adsorption BET method, and is only used to characterize the physical adsorption specific surface area of the negative electrode active material. The "particle size specific surface area" of the negative electrode active material in the present application is obtained by the laser diffraction particle size analysis, and may be used to characterize the degree that the morphology of the negative electrode active material deviates from the sphericity.

The inventors have found, through research, that when the particle size and specific surface area of the negative electrode active material falls within an appropriate range, the channels for the deintercalation and intercalation of ions in the negative electrode film layer can be further improved, the resistance to exchanging charge can be reduced, and the negative electrode film layer can have more developed pores, and impedance to the conductivity of active ions in liquid phase can be reduced; and at the same time, the risk of film peeling and dust generating of the negative electrode plate can be further reduced. Accordingly, the negative electrode plate maintains good electron conductivity, so as to further improve the fast charging performance and cycle performance of the battery. Furthermore, a good reactive interface can be maintained on the negative electrode plate during the cycle, so that the cycle performance of the battery can be further improved. In addition, the negative electrode active material has an appropriate particle size specific surface area, which would result in tightly packed particles on the prepared negative electrode plate. Therefore, the volume energy density of the battery is increased.

In some preferred embodiments, the negative electrode active material comprises secondary particles, and the proportion Q of the secondary particles in the negative electrode active material satisfies Q≥30%. The inventors have found, after further research, that when the negative electrode active material contains a certain content of secondary particles, they can provide more channels for the deintercalation and intercalation of ions. As a result, the fast charging and cycle performances of the battery can be further improved. More preferably, Q≥50%. For example, 55%≤Q≤100%, 65%≤Q≤95%, 75%≤Q≤100%, or 85%≤Q≤95%, etc.

In some preferred embodiments, the negative electrode active material satisfies 0.8≤($D_v$90−$D_v$10)/$D_v$50≤1.6. For example, ($D_v$90−$D_v$10)/$D_v$50 of the negative electrode active material may be 0.85, 0.9, 0.95, 1.0, 1.05, 1.1, 1.15, 1.2, 1.25, 1.3, 1.35, 1.4, 1.45, or 1.5. More preferably, 0.9≤($D_v$90−$D_v$10)/$D_v$50≤1.4. Especially preferably, 1.2≤$D_v$10)$D_v$50≤1.38.

($D_v$90−$D_v$10)/$D_v$50 (that is, the particle size span) of the negative electrode active material reflects the degree that the larger particles size and the smaller particles size in the negative electrode active material deviate from the volume average particle size (that is, $D_v$50). Under the condition that ($D_v$90−$D_v$10)/$D_v$50 of the negative electrode active material falls within the proper ranges, the processing performance of the negative electrode slurry can be improved, the negative electrode active material can be uniformly dispersed in the negative electrode slurry, and the problems such as the coating of the negative electrode film layer would be missed or uneven during the coating process can be effectively prevented. Therefore, under the condition that ($D_v$90−$D_v$10)/$D_v$50 of the negative electrode active material falls within an appropriate range, the negative electrode active material particles can have higher dispersion uniformity in the negative electrode film layer, and thus the negative electrode plate has higher active ions and electrons transmission performance. As a result, the fast charging performance of the battery is further improved. Further, the polarization of the battery is significantly alleviated, and the cycle performance of the battery can be improved.

In some preferred embodiments, the volume average particle diameter WO of the negative electrode active material satisfies 8 μm≤$D_v$50≤16 μm. For example, $D_v$50 of the negative electrode active material may be 9 μm, 10 μm, 11 μm, 12 μm, 13 μm, 14 μm, or 15 μm. Preferably, 10 μm≤$D_v$50≤14 μm.

Under the condition that WO of the negative electrode active material falls within an appropriate range, the negative electrode active material can have more surface active sites, the transmission path for electrons and active ions inside the particles can be shorter, and the negative electrode plate using the same have smaller interface resistance. As a result, the fast charging performance of the battery can be further improved. In addition, under the condition that $D_v$50 of the negative electrode active material falls within the given range, the side reaction of the electrolyte in the negative electrode can be reduced, so that the battery has a higher cycle performance.

In some preferred embodiments, the volume particle size distribution $D_v$10 of the negative electrode active material satisfies 5 μm≤$D_v$10≤10 μm. More preferably, 6.0 μm≤$D_v$10≤8.0 μm. Under the conditioned that $D_v$10 of the negative electrode active material falls within the given range, the number of small particles in the negative electrode film layer is less, and thus the side reactions of the electrolyte at the negative electrode interface can be reduced. As a result, the cycle performance and high-temperature storage performance of the battery can be improved.

In some preferred embodiments, the tap density of the negative electrode active material is from 0.8 g/cm³ to 1.2 g/cm³, and more preferably from 0.95 g/cm³ to 1.05 g/cm³. Under the condition that the tap density of the negative electrode active material falls within the given range, the negative electrode film layer can have a higher compaction density, so as to ensure good contact among the negative electrode active material particles. As a result, the fast charging performance and energy density of the battery can be improved.

In some preferred embodiments, the graphitization degree of the negative electrode active material is from 91.0% to 96.0%, more preferably from 92.0% to 94.5%, and especially preferably from 92.5% to 93.5%. Under the condition that the graphitization degree of the negative electrode active material falls within the given range, higher powder conductivity and larger graphite layer spacing can be balanced. Thus, the fast charging performance of the battery can be further improved. At the same time, since the negative electrode active material has better structural stability during the charging and discharging, the cycle performance of the battery can be improved.

In some preferred embodiments, the gram capacity C of the negative electrode active material satisfies 345 mAh/g≤C≤360 mAh/g, and more preferably 348 mAh/g≤C≤355 mAh/g. While the negative electrode active material has a relatively high gram capacity, it can shorten migration paths of active ions therein and increase the solid-phase diffusion rate of active ions, so that the battery has relatively high energy density and fast charging capability. In addition, the negative electrode active material may further have relatively high structural stability, so it is not easy to disintegrate when subjected to a force (such as cyclic expansion force or cold press force, etc.), and particles in the electrode plate can have relatively high bonding force, so that the battery has relatively high cycle performance.

In the present application, the particle size uniformity of the negative electrode active material may be measured by a laser diffraction particle size analysis method, and specifically may be directly measured by a laser diffraction particle size analyzer such as Malvern Mastersizer 3000. The measurement can be conducted with reference to the standard GB/T19077-2016.

In this application, the particle size specific surface area, $D_v10$, $D_v50$, and $D_v90$ of the negative electrode active material can be tested according to methods well-known in the art. For example, the measurement can be readily conducted with reference to GB/T 19077-2016 Particle size analysis-Laser diffraction distribution method and on a laser particle size analyzer (such as Mastersizer 3000).

Herein, physical definitions of $D_v10$, $D_v50$, and $D_v90$ are as follows:

$D_v10$: the corresponding particle size when the cumulative volume distribution percentage of the negative electrode active material reaches 10%;

$D_v50$: the corresponding particle size when the cumulative volume distribution percentage of the negative electrode active material reaches 50%; and $D_v90$: the corresponding particle size when the cumulative volume distribution percentage of the negative electrode active material reaches 90%.

In this application, the primary particles and the secondary particles have a meaning well-known in the art. Primary particles refer to non-agglomerated particles; and secondary particles refer to aggregated particles formed by the aggregation of two or more primary particles.

The proportion of the secondary particles in the negative electrode active material may be tested by methods well-known in the art. An exemplary testing method is as follows: laying and gluing the negative electrode active material on the conductive glue to make testing sample of length×width=6 cm×1.1 cm; and testing the morphology of the particles in the testing sample by means of scanning electron microscope (such as ZEISS sigma300). The test may refer to JY/T010-1996. In order to ensure the accuracy of the test results, scanning tests may be conducted on multiple (for example, 20) different areas randomly selected on the tested sample, and the percentage of the number of the secondary particles to the total number of particles in the test area may be calculated at certain magnification (for example, 1000 times), so as to obtain the proportion of secondary particles in this test area. The average of the test results of multiple test areas is taken as the proportion of the secondary particles in the negative electrode material.

The graphitization degree of the negative electrode active material has a well-known meaning in the art, and may be measured by a method well-known in the art. For example, the measurement may be conducted by an X-ray diffraction instrument (such as Bruker D8 Discover). The measurement may refer to JIS K 0131-1996 and JB/T 4220-2011 as follows: measuring the value of $d_{002}$, and calculating the graphitization degree according to formula $G=(0.344-d_{002})/(0.344-0.3354)\times100\%$, wherein $d_{002}$ is the interlayer spacing in the graphite crystal structure in nm. In the X-ray diffraction analysis, a Cu target is used as the anode target, CuKα rays are used as the radiation source, the ray wavelength is $\lambda=1.5418$ Å, the scanning 2θ angle is in a range of 20°-80°, and the scanning rate is 4°/min.

The tap density of the negative electrode active material has a well-known meaning in the art, and may be measured by a method well-known in the art. For example, the tap density may be measured by a powder tap density tester with reference to standard GB/T5162-2006. For example, the tap density is measured by using FZS4-4B tap density meter from Beijing Iron and Steel Research Institute, wherein the test parameters are as follows: vibration frequency: 250±15 times/min, amplitude: 3±0.2 mm, number of vibrations: 5000 times, and measuring cylinder: 25 mL.

The gram capacity of the negative electrode active material has a well-known meaning in the art, and may be measured by methods well-known in the art. An exemplary measuring method is as follows: uniformly mixing the prepared negative electrode active material, the carbon black (Super P) as a conductive agent, and the polyvinylidene fluoride (PVDF) as a binder in a mass ratio of 91.6:1.8:6.6 with solvent N-methylpyrrolidone (NMP), to obtain a slurry; applying the prepared slurry on the current collector of copper foil and drying in an oven for subsequent using; using metal lithium sheet as the counter electrode and polyethylene (PE) film as the separator; mixing ethylene carbonate (EC), ethyl methyl carbonate (EMC), and diethyl carbonate (DEC) at a volume ratio of 1:1:1, and then dissolving $LiPF_6$ in the above solution to obtain an electrolytic solution, wherein the concentration of $LiPF_6$ is 1 mol/L; assembling a CR2430 button cell in a glove box protected under argon; after keeping the obtained button cell standing for 12 hours, discharging the button cell to 0.005V at a constant current of 0.05 C at 25° C., then discharging to 0.005V at a constant current of 50 μA after an another 10-minute standing, then discharging to 0.005V at a constant current of 10 μA after a still another 10-minute standing and charging to 2V at a constant current of 0.1 C so as to record the charging capacity. The ratio of the charging capacity to the mass of the negative electrode active material is the gram capacity of the prepared negative electrode active material.

Next, a method for preparing negative electrode active materials provided according to the present application will be described. The above-mentioned negative electrode active materials can be prepared by the method.

S10, providing a coke raw material, wherein the coke raw material has a volume average particle size $D_v50$ of from 6 μm to 12 μm, and the coke raw material has a volatile content $C_1$ satisfying $1\%\leq C_1\leq 12\%$.

S20, shaping and grading the coke raw material to obtain a precursor, wherein the precursor has a particle size uniformity $U_1$ satisfying $0.2\leq U_1\leq 0.5$.

S30, granulating the precursor, during the granulating a binder is added in an amount of $C_2$, wherein $C_1$, $C_2$ and $U_1$ satisfy $21\%\leq(C_1+C_2)/U_1\times100\%\leq 50\%$.

S40, graphitizing the granulated product to obtain an artificial graphite, wherein the artificial graphite has a particle size uniformity $U_2$ satisfying $0.22\leq U_2\leq 0.48$.

S50, coating the artificial graphite with an organic carbon source, performing heat treatment to form an amorphous carbon coating layer on at least a part of the surface of the artificial graphite, to obtain the negative electrode active material, wherein the organic carbon source added during forming the coating layer has an amount $C_3$, and wherein $C_3$, $C_1$, $C_2$ and $U_2$ satisfy $20\% \leq (C_1+C_2+C_3)/U_2 \times 100\% \leq 55\%$, and $1.5\% \leq C_3 \times$ carbon residue rate $\leq 2.5\%$.

In the above preparing method, in step S10, the coke raw material may be directly purchased commercially or obtained by crushing a coke material. In some embodiments, the coke material is crushed to obtain the coke raw material. The morphology of the coke raw material obtained after crushing may comprise one or more of block, sphere, and sphere-like shapes.

The coke raw material obtained by crushing has $D_v50$ of from 6 μm to 12 μm, and preferably from 7 μm to 10 μm. Under the condition that the $D_v50$ of the coke raw material falls within an appropriate range, the subsequent granulating process can be improved, so that the obtained negative electrode active material has appropriate particle size specific surface area, number ratio of secondary particles, and $D_v50$.

In step S10, the coke raw material has a volatile content $C_1$ satisfying $1\% \leq C_1 \leq 12\%$. For example, the volatile content $C_1$ of the coke raw material may be 2%, 3%, 4%, 5%, 6%, 7%, 8%, 9%, 10%, or 11%. Under the condition that the coke raw material has appropriate volatile content, the prepared artificial graphite can have relatively high structural strength, and thus it is beneficial to improving the cycle stability of the negative electrode active material. Preferably, $5\% \leq C_1 \leq 9\%$.

The volatile content of the coke raw material can be tested by a method well-known in the art. For example, it can be tested with reference to SH/T 0026-1990.

In some embodiments, the coke raw material includes one or more of petroleum-based non-needle coke, petroleum-based needle coke, coal-based non-needle coke, and coal-based needle coke.

Preferably, the coke raw material is one or more selected from petroleum-based non-needle coke (such as petroleum calcined coke and petroleum green coke) and petroleum-based needle coke. More preferably, the coke raw material comprises petroleum green coke. The appropriate coke raw material enables the prepared negative electrode active material to have the capability of quickly transmitting active ions and simultaneously to have relatively high structural stability, which is beneficial to improving the fast charging and cycle performances of the battery.

The coke raw material can be crushed using equipment and methods known in the art, such as an air-current mill, a mechanical mill or a roller mill. Many too small particles are often produced during the crushing, and sometimes too large particles are also produced, so grading can be performed after the crushing to remove the too small and large particles from the powder after the crushing. The obtained coke raw material after the grading, with a relatively good particle size distribution, facilitates the subsequent shaping and granulating. The grading can be carried out by using equipment and methods known in the art, such as a grading screen, a gravity grader, or a centrifugal grader.

In step S20, edges and corners of the coke raw material particles are polished by shaping. The greater the degree of shaping is, the closer the particles are to the sphere, which can increase the number of the sites for the deintercalation and intercalation of active ions on the surface of the negative electrode active material. The shaping is also beneficial for the subsequent granulating, so that the secondary particles in the obtained negative electrode active material have relatively high structural stability.

In step S20, the coke raw material can be shaped by equipment and methods known in the art, such as a shaping machine or other shaping equipment.

After the coke raw material is shaped, the coke raw material is further graded to obtain a precursor of $0.2 \leq U_1 \leq 0.5$. The grading controls the particle size uniformity of the precursor within an appropriate range, so that the particle size uniformity of the obtained negative electrode active material falls within desired ranges. Preferably, $0.25 \leq U_1 \leq 0.45$. More preferably, $0.3 \leq U_1 \leq 0.45$.

In step S20, the grading can be carried out by using equipment and methods known in the art, such as a grading screen, a gravity grader, or a centrifugal grader.

In step S30, the precursor as processed in step S20 is granulated to obtain secondary particles. In the granulating process of step S30, the amount $C_2$ of binder added during granulating, the volatile content $C_1$ of the coke raw material, and $U_1$ of the precursor satisfy $21\% \leq (C_1+C_2)/U_1 \times 100\% \leq 50\%$, preferably, $30\% \leq (C_1+C_2)/U_1 \times 100\% \leq 40\%$, and more preferably, $31\% \leq (C_1+C_2)/U_1 \times 100\% \leq 35\%$. This can allow artificial graphite to have a good degree of secondary particles (that is, the ratio of the particle size of the primary particles to the particle size of the secondary particle in the secondary particles), so that the negative electrode active material has improved capability of deintercalating and intercalating active ions and as well has better structural stability. In addition, the negative electrode active material also has improved capacity per gram.

The amount $C_2$ of the binder added during granulating is the percentage of the weight of the binder added during the granulating to the total weight of the precursor. The granulating process is carried out with or without the addition of a binder, thus, $C_2 \geq 0$. Further, $0\% \leq C_2 \leq 16\%$. Furthermore, $2\% \leq C_2 \leq 10\%$.

In some embodiments, in step S30, the binder is preferably selected from pitch.

In step S30, the granulating can be carried out by using equipment known in the art, such as a granulator. The granulator usually includes a stirred reactor and a module for temperature control of the reactor. By adjusting the stirring speed, heating rate, granulating temperature, cooling rate, etc. during the granulating, the granulation degree and structural strength of the granules can be adjusted.

Further, by adjusting the above process conditions, the volume average particle size $D_v50$ of the granulated product can be within the required range, and more preferably, the $D_v10$, $D_v50$, and $D_v90$ of the granulated product can all be within the required ranges.

By adjusting the particle size in step S10 and/or step S30, the $D_v50$, $D_v10$ and/or $(D_v90-D_v10)/D_v50$ of the finally obtained negative electrode active material can be within the required ranges.

In step S40, the granulated product obtained in step S30 is graphitized at a temperature of from 2800° C. to 3200° C. to obtain artificial graphite with an appropriate graphitization degree. In some embodiments, the temperature for graphitizing in step S40 is preferably from 2900° C. to 3100° C. When the graphitization degree is controlled within the given range, the artificial graphite has a relatively high capacity per gram, and the lattice expansion during the deintercalation and intercalation of lithium ions is relatively low.

In step S40, the graphitizing can be carried out using equipments known in the art, such as a graphitization furnace, and further, an Acheson graphitization furnace.

After the graphitizing, a small amount of too large particles formed by agglomeration of the granulated product during the high-temperature graphitization process can be removed by sieving. This can prevent the too large particles from affecting material processing properties, such as slurry stability and coating property.

The particle size uniformity $U_2$ of the artificial graphite obtained in step S40 preferably satisfies $0.22 \leq U_2 \leq 0.48$, more preferably $0.26 \leq U_2 \leq 0.43$, and particularly preferably $0.3 \leq U_2 \leq 0.4$. The particle size uniformity of the artificial graphite obtained in step S40 falls within a proper range, which is beneficial to making the particle size uniformity of the negative electrode active material finally obtained fall within the required range.

In some embodiments, in step S50, the artificial graphite obtained in step S40 is mixed with an organic carbon source, so that the organic carbon source is coated on at least a part of the surface of the artificial graphite; and then heating treatment at a temperature of from 700° C. to 1800° C. is performed to carbonize the organic carbon source and form an amorphous carbon coating layer on at least the part of the surface of the artificial graphite, to obtain the negative electrode active material. Preferably, the temperature of the heating treatment is from 1000° C. to 1300° C.

The amount $C_3$ of the organic carbon source added during coating, the volatile content $C_1$ of coke raw materials and the amount $C_2$ of the binder added during granulating satisfy $20\% \leq (C_1+C_2+C_3)/U_2 \times 100\% \leq 55\%$, and the organic carbon source satisfies $1.5\% \leq C_3 \times \text{carbon residue rate} \leq 2.5\%$. The amount $C_3$ of the organic carbon source is a percentage of the weight of the organic carbon source added during the coating relative to the total weight of the artificial graphite. The carbon residue rate is the carbon residue rate of the organic carbon source. It can be tested with LP-5731 coal pitch coking value tester. The test can refer to GB/T268 Measurement Method for Carbon Residue in Petroleum Product and GB/T8727-2008 Measurement Method for Coking Value of Coal Pitch Product.

Under the condition that the amount of the organic carbon source added during coating satisfies the above relationship, the granulating degree of the negative electrode active material particles can be improved, so that it is beneficial to making the particle size uniformity of the negative electrode active material, the particle size specific surface area, and the proportion of the secondary particles fall within the aforementioned range. In addition, the amount of the organic carbon source within the range and the coating layer having an appropriate proportion in the negative electrode active material enable the negative electrode active material to have relatively high kinetic performance and relatively long cycle life. More preferably, $30\% \leq (C_1+C_2+C_3)/U_2 \times 100\% \leq 48\%$, and $1.8\% \leq C_3 \times \text{carbon residue rate} \leq 2.4\%$. More preferably, $40\% \leq (C_1+C_2+C_3)/U_2 \times 100\% \leq 48\%$.

Optionally, $2\% \leq C_3 \leq 8\%$, for example, $C_3$ may be 3%, 4%, 5%, 6%, or 7%.

In some embodiments, the organic carbon source may be one or more selected from coal pitch, petroleum pitch, phenolic resin, coconut shell, etc., and preferably coal pitch.

Secondary Battery

An embodiment according to the second aspect of the present application provides a secondary battery. The secondary battery comprises a negative electrode plate, and the negative electrode plate comprises the negative electrode active material according to the first aspect of the present application.

Since the secondary battery of the present application adopts the negative electrode active material according to the first aspect of the present application, it can simultaneously have relatively high energy density, fast charging performance, cycle performance and high temperature storage performance.

The secondary battery further comprises a positive electrode plate and an electrolyte. During charge and discharge of the battery, active ions are repeatedly intercalated and deintercalated between the positive electrode plate and the negative electrode plate. The electrolyte conducts ions between the positive electrode plate and the negative electrode plate.

[Negative Electrode Plate]

The negative electrode plate comprises a negative electrode current collector and a negative electrode film layer disposed on at least one surface of the negative electrode current collector, and the negative electrode film layer comprises the negative electrode active material according to the first aspect of the present application.

As an example, the negative electrode current collector has two opposite surfaces in the thickness direction thereof, and the negative electrode film layer is stacked on either or both of the two opposite surfaces of the negative electrode current collector.

In the secondary battery of the present application, the negative electrode current collector may use a metal foil or a composite current collector. For example, a copper foil may be used. The composite current collector may include a polymer material substrate and a metal layer formed on at least one surface of the polymer material substrate. The composite current collector can be formed by applying metal materials (copper, copper alloy, nickel, nickel alloy, titanium, titanium alloy, silver and silver alloy, etc.) on a polymer material substrate (such as polypropylene PP, polyethylene terephthalate PET, polybutylene terephthalate PBT, polystyrene PS, polyethylene PE and their copolymers and other substrates).

In the secondary battery of the present application, the negative electrode film layer usually contains a negative electrode active material, an optional binder, an optional conductive agent, and other optional auxiliary agents, and is usually formed by coating and drying the negative electrode slurry. The negative electrode slurry is usually formed by dispersing the negative electrode active material and the optional conductive agent and binder in a solvent and stirring. The solvent can be N-methylpyrrolidone (NMP) or deionized water.

As an example, the conductive agent may include one or more of superconducting carbon, acetylene black, carbon black, Ketjen black, carbon dots, carbon nanotubes, graphene, and carbon nanofibers.

As an example, the binder may include on or more of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

Other optional auxiliary agents are, for example, thickeners (such as sodium carboxymethyl cellulose CMC-Na) and the like.

In the secondary battery of the present application, in addition to the negative electrode active material according to the first aspect of the present application, the negative electrode film layer may also optionally comprise a certain amount of other commonly used negative electrode active materials, such as one or more of other artificial graphite, natural graphite, soft carbon, hard carbon, silicon-based materials, tin-based materials and lithium titanate. The silicon-based materials may be one or more selected from elemental silicon, silicon-oxygen compounds, silicon-carbon composites, silicon-nitrogen composites, and silicon alloys. The tin-based materials may be one or more selected from elemental tin, tin oxide compounds, and tin alloys.

The inventors, after in-depth research, have found that the performance of the secondary battery can be further improved, provided that the negative electrode plate of the secondary battery as described in the present application satisfies the above design conditions and further satisfies one or more of the following design conditions.

In some preferred embodiments, the porosity of the negative electrode film layer is from 20% to 50%. For example, the porosity of the negative electrode film layer may be 20%, 23%, 28%, 30%, 35%, 38%, or 42%. More preferably, the porosity of the negative electrode film layer is from 25% to 40%.

The negative electrode film layer having the porosity that falls within the above range can have suitable electrolyte wettability and good reaction interface, so as to improve the charging and discharging performance of the negative electrode at large rate. Consequently, the fast charging performance of the battery can be improved. At the same time, the negative electrode film layer, also having the ability of retaining proper amount of electrolyte solution, can lower the weight of the battery, so as to allow the battery to have a higher weight energy density.

In some preferred embodiments, the compaction density of the negative electrode film layer is from 1.45 $g/cm^3$ to 1.7 $g/cm^3$, and more preferably from 1.55 $g/cm^3$ to 1.65 $g/cm^3$. Under the condition that the compaction density of the negative electrode film layer falls within the given range, the negative electrode plate can have higher reversible capacity, and have good low cycle expansion performance and dynamic performance as well. As a result, the energy density, fast charging performance and cycle performance of the battery can be further improved.

In some preferred embodiments, the areal density of the negative electrode film layer is from 75 $g/m^2$ to 130 $g/m^2$, and more preferably from 90 $g/m^2$ to 110 $g/m^2$. Under the condition that the areal density of the negative electrode film layer falls within the given range, the negative electrode plate can have higher reversible capacity and at the same time can have lower resistance to transport active ions and electrons. As a result, the energy density, fast charging performance and cycle performance of the battery can be further improved.

Herein, the parameters directing to the negative electrode film layer refer to those of the single-side of the negative electrode film layer. That is to say, when the negative electrode film layers are arranged on two surfaces of the negative electrode current collector, provided that the parameters of the negative electrode film layer on any surfaces fall within the data ranges of the present application, it is considered that the parameters of the negative electrode film layer fall within the protection scope of the present application.

In addition, in the secondary battery of the present application, the negative electrode plate does not exclude additional functional layers other than the negative electrode film layer. For example, in some embodiments, the negative plate as described in the present application further includes a conductive primer layer (for example, composed of a conductive agent and a binder) sandwiched between the negative electrode current collector and the negative electrode film layer and disposed on the surface of the negative electrode current collector. In some other embodiments, the negative electrode plate as described in the present application further includes a protective layer covering the surface of the negative electrode film layer.

In the present application, the porosity of the negative electrode film layer has a meaning well-known in the art, and can be tested by a method well-known in the art. For example, it may be measured by gas displacement method with reference to GB/T24586-2009. The test method is as follows: taking a negative electrode plate that is coated on single-side and is cold-pressed (under the condition that the negative electrode plate is coated on double-side, the negative electrode film layer on one side should be wiped off), and punching it into a small wafer with a diameter of 14 mm; measuring the thickness of the negative electrode film layer (the thickness of the negative electrode plate subtracts the thickness of the negative current collector); calculating the apparent volume $V_1$ of the negative electrode film layer according to the formula for calculating the cylinder volume; measuring the true volume of the negative electrode plate on a true density tester (such as Micromeritics AccuPyc II 1340) according to gas displacement method under the media of inert gas such as helium or nitrogen, and the measurement may refer to GB/T 24586-2009; and obtaining the true volume $V_2$ of the negative electrode film layer by subtracting the volume of the negative electrode current collector with true volume of the negative electrode plate; the porosity of the negative electrode film layer=$(V_1-V_2)/N_1 \times 100\%$. Multiple (such as 30) plate samples can be used for testing and the results are calculated to obtain average value so as to improve the accuracy of the test results.

In this application, the areal density of the negative electrode film layer has a meaning well-known in the art, and can be tested using methods well-known in the art. For example, the testing may be conducted as follows: taking a negative electrode plate that is coated on single-side and is cold-pressed (under the condition that the negative electrode plate is coated on double-side, the negative electrode film layer on one side should be wiped off), punching it into a small wafer with an area of $S_1$, and weighing its weight, recorded as $M_1$; and then wiping off the negative electrode film layer on the negative electrode plate as weighed as above, and weighing the negative electrode current collector, recorded as M. The areal density of the negative electrode film layer=(weight of the negative electrode plate $M_1$−weight of the negative electrode current collector $M_0$)/$S_1$.

In this application, the compaction density of the negative electrode film layer has a meaning well-known in the art, and may be measured by a method known in the art. The compaction density of the negative electrode film layer=the areal density of the negative electrode film layer/the thickness of the negative electrode film layer.

In this application, the thickness of the negative electrode film layer has a meaning well-known in the art, and can be tested using methods well-known in the art. For example, the teat may be conducted on a 4-digit precision spiral micrometer.

[Positive Electrode Plate]

The positive electrode plate comprises a positive electrode current collector and a positive electrode film layer arranged on at least one surface of the positive electrode current collector, wherein the positive electrode film layer comprises positive electrode active material.

As an example, the positive electrode current collector has two opposite surfaces in its own thickness direction, and the positive electrode film layer is stacked on either or both of the two opposite surfaces of the positive electrode current collector.

In the secondary battery of the present application, the positive electrode current collector may adopt metal foil or a composite current collector. For example, aluminum foil may be used. The composite current collector may include a polymer substrate and a metal layer formed on at least one surface of the polymer substrate. The composite current collector can be made by forming a metal material (aluminum, aluminum alloy, nickel, nickel alloy, titanium, titanium alloy, silver, silver alloy, or the like) on a polymer substrate (such as a substrate of polypropylene, poly(ethylene terephthalate), poly(butylene terephthalate), polystyrene, polyethylene, or copolymers thereof).

In the secondary battery of the present application, the positive electrode active material may be a positive electrode active material for secondary batteries that is well-known in the art. For example, the positive electrode active material may comprises one or more of olivine-structured lithium-containing phosphates, lithium transition metal oxides, and the modified compounds thereof. However, the present application is not limited to these materials, other conventionally known materials that can be used as positive electrode active materials for secondary batteries can also be used. These positive electrode active materials may be used alone or in combination of two or more. Examples of lithium transition metal oxides may include, but are not limited to, one or more of lithium cobalt oxide (such as $LiCoO_2$), lithium nickel oxide (such as $LiNiO_2$), lithium manganese oxide (such as $LiMnO_2$, and $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3}O_2$ (NCM333), $LiNi_{0.5}Co_{0.2}Mn_{0.3}O_2$ (NCM523), $LiNi_{0.5}Co_{0.25}Mn_{0.25}O_2$ (NCM211), $LiNi_{0.6}Co_{0.2}Mn_{0.2}O_2$ (NCM622), $LiNi_{0.8}Co_{0.1}Mn_{0.1}O_2$ (NCM811)), lithium nickel cobalt aluminum oxide (such as $LiNi_{0.85}Co_{0.15}Al_{0.05}O_2$) and the modified compounds thereof. Examples of olivine-structured lithium-containing phosphates may include, but are not limited to, one or more of lithium iron phosphate (such as $LiFePO_4$ (LFP)), lithium iron phosphate and carbon composite material, lithium manganese phosphate (such as $LiMnPO_4$), composite of lithium manganese phosphate and carbon, lithium iron manganese phosphate, and composite of lithium iron manganese phosphate and carbon.

In some preferred embodiments, in order to further increase the energy density of the battery, the positive electrode active material comprises one or more of the lithium transition metal oxide as shown in Formula 1 and modified compounds thereof, $$Li_aNi_bCo_cM_dO_eA_f \qquad \text{Formula 1,}$$

in the Formula 1, $0.8 \leq a \leq 1.2$, $0.5 \leq b < 1$, $0 < c < 1$, $0 < d < 1$, $1 \leq e \leq 2$, $0 \leq f \leq 1$; M is one or more selected from Mn, Al, Zr, Zn, Cu, Cr, Mg, Fe, V, Ti and B, and preferably is one or more of Mn and Al; and A is one or more selected from N, F, S and Cl, and preferably is F.

The above modified compounds may be positive electrode active materials that undergo doping modification and/or surface coating modification.

In some embodiments, the positive electrode film layer may further optionally comprise a binder. The type of the binder is not specifically limited, and a person skilled in the art can select the binder according to actual requirements. As an example, the binder for the positive electrode film layer may include one or more of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer and fluorine-containing acrylate resin.

In some embodiments, the positive electrode film layer may further optionally include a conductive agent. The type of the conductive agent is not specifically limited, and a person skilled in the art can select the conductive agent according to actual requirements. As an example, the conductive agent for the positive electrode film layer may include one or more of superconducting carbon, acetylene black, carbon black, Ketjen black, carbon dots, carbon nanotubes, graphene, and carbon nanofibers.

The positive electrode plate can be prepared according to a method known in the art. As an example, a positive electrode active material, a conductive agent and a binder are dispersed in a solvent (such as N-methylpyrrolidone (NMP)) to form a uniform positive electrode slurry; the positive electrode slurry is coated on a positive electrode current collector, and the positive electrode plate is obtained after steps of drying, cold pressing, etc.

[Electrolyte]

The electrolyte conducts ions between the positive electrode plate and the negative electrode plate. The type of the electrolyte is not specifically limited in the present application, and may be selected according to requirements. For example, the electrolyte may be selected from at least one of solid electrolytes and liquid electrolytes (i.e., electrolytic solution).

In some embodiments, the electrolyte adopts electrolytic solution. The electrolytic solution includes an electrolyte salt and a solvent.

In some embodiments, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium difluorosulfimide), LiTFSI (lithium bistrifluoromethanesulfonimide), LiTFS (lithium trifluoromethanesulfonate), LiDFOB (lithium difluorooxalate), LiBOB (lithium bisoxalate), $LiPO_2F_2$ (lithium difluorophosphate), LiDFOP (lithium difluorobisoxalate phosphate), and LiTFOP (lithium tetrafluorooxalate phosphate).

In some embodiments, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

In some embodiments, the electrolyte liquid may further optionally include additives. For example, the additives may include negative electrode film layer-forming additives, positive electrode film layer-forming additives, and additives that can improve some performances of the battery, such as additives that improve overcharge performance of the battery, additives that improve high-temperature performance of the battery, and additives that improve low-temperature performance of the battery.

[Separator]

Secondary batteries using electrolytic solution and some secondary batteries using solid electrolytes further include separators. The separator is disposed between the positive electrode plate and the negative electrode plate to serve as an isolation. The type of the separator is not specially limited in the present application, and the separator may be any known porous separator with good chemical and mechanical stability. In some embodiments, the material of the separator may include one or more of glass fibers, non-woven fabric, polyethylene, polypropylene, and polyvinylidene fluoride. The separator may be a single-layer film or a multi-layer composite film. When the separator is a multi-layer composite film, materials of respective layers may be the same or different.

In some embodiments, the positive electrode plate, the negative electrode plate, and the separator can be made into an electrode assembly by a winding process or a stacking process.

In some embodiments, the secondary battery may include an outer package. The outer package may be used to package the electrode assembly and an electrolyte.

In some embodiments, the outer package of the secondary battery may be a hard case, such as a hard plastic case, an aluminum case, a steel case, etc. The outer package of the secondary battery may also be a soft bag, such as a pocket type soft bag. The material of the soft bag may be plastic, such as one or more of polypropylene (PP), polybutylene terephthalate (PBT), polybutylene succinate (PBS), etc.

Figure 1:
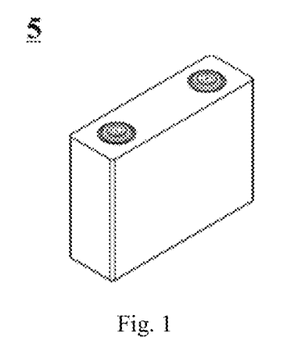
FIG. 1 is a schematic diagram of a secondary battery according to an embodiment.

The present application does not have particular limitation to the shape of the secondary battery. The secondary battery may be cylindrical, square, or in other arbitrary shape. FIG. 1 shows a secondary battery 5 with a square structure as an example.

Figure 2:
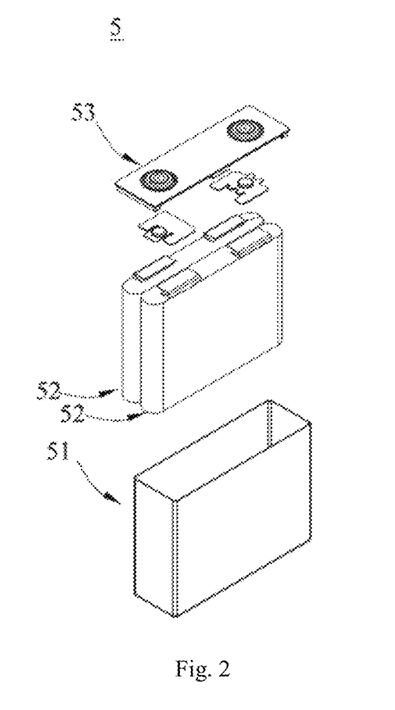
FIG. 2 is an exploded view of FIG. 1.

In some embodiments, referring to FIG. 2, the outer package may include a shell 51 and a cover plate 53. The shell 51 may include a bottom plate and side plates connected to the bottom plate, and the bottom plate and the side plates enclose an accommodating cavity. The shell 51 has an opening communicated with the accommodating cavity, and the cover plate 53 can cover the opening to close the accommodating cavity.

The electrode assembly 52 is packaged in the receiving cavity. The electrolyte may adopt electrolyte liquid, and the electrolyte liquid infiltrates the electrode assembly 52.

The secondary battery 5 includes one or more electrode assemblies 52, which can be adjusted according to requirements.

In some embodiments, the secondary batteries may be assembled into a battery module, the battery module may include a plurality of secondary batteries, and the specific number can be adjusted according to the application and capacity of the battery module.

Figure 3:
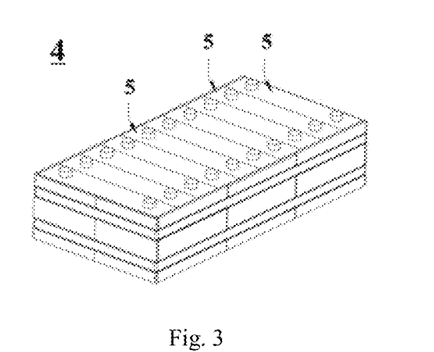
FIG. 3 is a schematic diagram of a battery module according to an embodiment.

FIG. 3 shows a battery module 4 as an example. Referring to FIG. 3, in the battery module 4, a plurality of secondary batteries 5 may be arranged sequentially in a length direction of the battery module 4. Of course, they may also be arranged in any other way. Further, the plurality of secondary batteries 5 may be fixed by fasteners.

Optionally, the battery module 4 may further include a housing having a receiving space, and the plurality of secondary batteries 5 are received in the receiving space.

In some embodiments, the above-mentioned battery module may also be assembled into a battery pack, and the number of battery modules included in the battery pack may be adjusted according to the application and capacity of the battery pack.

Figure 4:
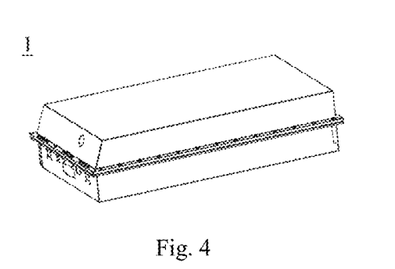
FIG. 4 is a schematic diagram of a battery pack according to an embodiment.
Figure 5:
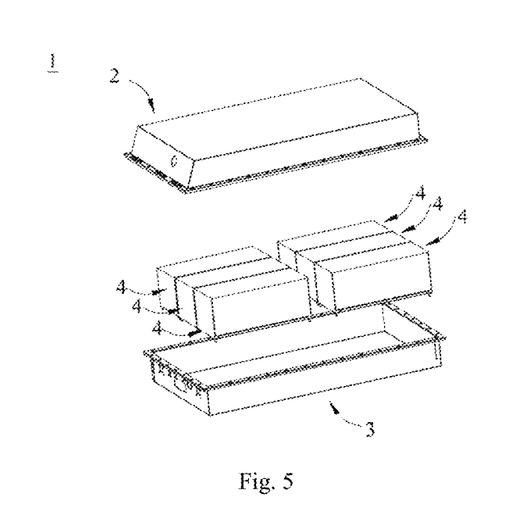
FIG. 5 is an exploded view of FIG. 4.

FIGS. 4 and 5 show a battery pack 1 as an example. Referring to FIGS. 4 and 5, the battery pack 1 may include a battery case and a plurality of battery modules 4 disposed in the battery case. The battery case includes an upper case body 2 and a lower case body 3. The upper case body 2 may cover the lower case body 3 to form a closed space for receiving to the battery modules 4. The plurality of battery modules 4 may be arranged in the battery case in any manner.

Apparatus

A third aspect of the present application provides an apparatus, including the secondary battery according to the second aspect of the present application. The secondary battery may be used as a power supply of the apparatus, and may also be used as an energy storage unit of the apparatus. The apparatus may be, but is not limited to, a mobile device (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The apparatus may select the secondary battery, the battery module, or the battery pack according to its usage requirements.

Figure 6:
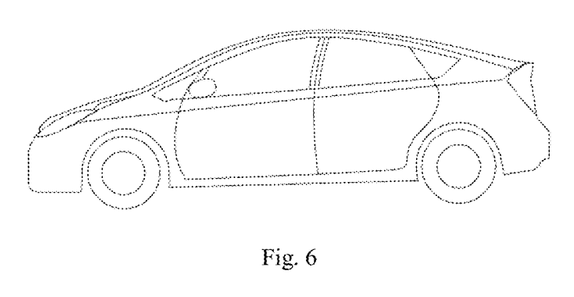
FIG. 6 is a schematic diagram an apparatus using the secondary battery as a power supply according to an embodiment.
Figure 7:
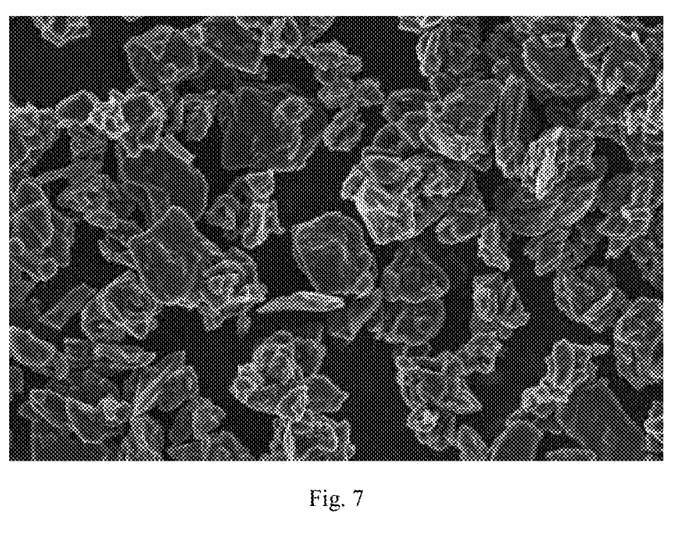
FIG. 7 is a scanning electron microscope (SEM) image of a negative electrode active material according to an embodiment.

FIG. 6 shows an apparatus as an example. The apparatus is a pure electric vehicle, a hybrid electric vehicle, or a plug-in hybrid electric vehicle. In order to meet the requirements of the apparatus for high power and high energy density of the secondary battery, a battery pack or a battery module may be used.

As another example, the apparatus may be a mobile phone, a tablet computer, a notebook computer, etc. The apparatus is generally required to be thin and light, and the secondary battery can be used as a power supply.

EXEMPLARY EMBODIMENTS

Embodiment 1. A negative electrode active material, comprising a core and a coating layer covering a surface of the core, wherein the core comprises artificial graphite, the coating layer comprises amorphous carbon, and the negative electrode active material has a particle size uniformity of from 0.25 to 0.45.

Embodiment 2. The negative electrode active material according to embodiment 1, wherein the particle size uniformity of the negative electrode active material is from 0.3 to 0.4, and preferably from 0.31 to 0.38.

Embodiment 3. The negative electrode active material according to embodiment 1 or 2, wherein the negative electrode active material has a particle size specific surface area of from 0.3 m$^2$/g to 0.65 m$^2$/g, and preferably from 0.4 m$^2$/g to 0.55 m$^2$/g.

Embodiment 4. The negative electrode active material according to any one of embodiments 1 to 3, wherein the negative electrode active material satisfies $0.8 \leq (D_v90-D_v10)/D_v50 \leq 1.6$, and preferably $0.9 \leq (D_v90-D_v10)/D_v50 \leq 1.4$.

Embodiment 5. The negative electrode active material according to any one of embodiments 1 to 4, wherein the negative electrode active material comprises secondary particles, and wherein the secondary particles have a number proportion of $\geq 30\%$ in the negative electrode active material, and preferably, the secondary particles have a number proportion of $\geq 50\%$ in the negative electrode active material.

Embodiment 6. The negative electrode active material according to any one of embodiments 1 to 5, wherein the negative electrode active material further satisfies one or more of the following conditions from (1) to (5):

(1) the negative electrode active material has a volume particle size distribution $D_v10$ satisfying 5 μm≤$D_v10$≤10 μm, and preferably 6.0 μm≤$D_v10$≤8.0 μm;
(2) the negative electrode active material has a volume average particle size $D_v50$ satisfying 8 μm≤$D_v50$≤16 μm, and preferably 10 μm≤$D_v50$≤14 μm;
(3) the negative electrode active material has a graphitization degree of from 91.0% to 96.0%, and preferably from 92.0% to 94.5%;
(4) the negative electrode active material has a gram capacity of from 345 mAh/g to 360 mAh/g, and preferably from 348 mAh/g to 355 mAh/g; and
(5) the negative electrode active material has a tap density of from 0.8 g/cm³ to 1.2 g/cm³, and preferably from 0.95 g/cm³ to 1.05 g/cm³.

Embodiment 7. A secondary battery comprising a negative electrode plate, wherein the negative electrode plate comprises a negative electrode current collector and a negative electrode film layer, including the negative electrode active material, arranged on at least one surface of the negative electrode current collector, and wherein the negative electrode active material comprises the negative electrode active material according to any one of embodiments 1 to 6.

Embodiment 8. The secondary battery according to embodiment 7, wherein the secondary battery further satisfies one or more of the following conditions from (1) to (3):
(1) the negative electrode film layer has a porosity of from 20% to 50%, and preferably from 25% to 40%;
(2) the negative electrode film layer has a compaction density of from 1.45 g/cm³ to 1.7 g/cm³, and preferably from 1.55 g/cm³ to 1.65 g/cm³; and
(3) the negative electrode film layer has an areal density of from 75 g/m² to 130 g/m², and preferably from 90 g/m² to 110 g/m².

Embodiment 9. The secondary battery according to any one of embodiments 7-8, characterized in that the secondary battery comprises a positive electrode plate, the positive electrode plate comprises a positive current collector and a positive electrode film layer, including a positive electrode active material, arranged on at least one surface of the positive current collector, and the positive electrode active material comprises one or more of olivine structured lithium-containing phosphate, lithium transition metal oxide and the modified compounds thereof, and preferably, the positive electrode active material comprises one or more of the lithium transition metal oxide as shown in Formula 1 and the modified compounds thereof, Formula 1, in the Formula 1, 0.8≤a≤1.2, 0.5≤b<1, 0<c<1, 0<d<1, 1≤e≤2, 0≤f≤1, M is one or more selected from Mn, Al, Zr, Zn, Cu, Cr, Mg, Fe, V, Ti and B, and A is one or more selected from of N, F, S and Cl.

Embodiment 10. An apparatus, comprising the secondary battery according to any of embodiments 7 to 9.

Embodiment 11. A method for preparing a negative electrode active material, comprising the following steps:
a) providing a coke raw material, wherein the coke raw material has a volume average particle size $D_v50$ of from 6 μm to 12 μm, and the coke raw material has a volatile content $C_1$ satisfying 1%≤$C_1$≤12%, and preferably, 5%≤$C_1$≤9%;
b) shaping and grading the coke raw material to obtain a precursor, wherein the precursor has a particle size uniformity $U_1$ satisfying 0.2≤$U_1$≤0.5;
c) granulating the precursor, during which a binder is added in an amount of $C_2$, wherein $C_1$, $C_2$ and $U_1$ satisfy 21%≤($C_1+C_2$)/$U_1$×100%≤50%, and preferably, 31%≤($C_1+C_2$)/$U_1$×100%≤35%;
d) graphitizing the granulated product at a temperature of from 2800° C. to 3200° C. to obtain an artificial graphite, wherein the artificial graphite has a particle size uniformity $U_2$ satisfying 0.22≤$U_2$≤0.48; and
e) coating the artificial graphite with an organic carbon source, performing heat treatment to form an amorphous carbon coating layer on at least a part of the surface of the artificial graphite, to obtain the negative electrode active material, wherein the organic carbon source added during forming the coating layer has an amount $C_3$, and wherein $C_3$, $C_1$, $C_2$ and $U_2$ satisfy 20%≤($C_1+C_2+C_3$)/$U_2$×100%≤55%, and 1.5%≤$C_3$×carbon residue rate ≤2.5%, wherein the negative electrode active material has a particle size uniformity of from 0.25 to 0.45.

Embodiment 12. The method according to embodiment 11, wherein the coke raw material comprises one or more of petroleum-based non-needle coke and petroleum-based needle coke; and preferably, the coke raw material comprises petroleum green coke.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

I. Preparation of Battery

Example 1

Preparation of a Negative Electrode Active Material
1) Crushing of raw material: crushing petroleum green coke with a mechanical mill or a roller mill. The coke raw material contained 7 wt % of volatiles $C_1$. After the crushing, grading was carried out to control the particle size distribution of the obtained coke raw material. $D_v50$ of the coke raw material was 7.5 μm.
2) Shaping and grading: shaping the coke raw material obtained in step 1) with a shaping machine, and then performing a grading treatment to obtain a precursor with a $U_1$=0.24.
3) Granulating: mixing the precursor obtained in step 2) with a binder, and granulating the precursor with a granulator. The binder added during the granulating had an amount $C_2$=2.5%.
4) Graphitizing: adding the granulated product obtained in step 3) into a graphitization furnace, and performing a graphitizing treatment at 3000° C. to obtain artificial graphite having a $U_2$=0.26.
5) Coating: mixing the artificial graphite obtained in step 4) with pitch as an organic carbon source coal, and performing a heat treatment at 1100° C. to obtain a negative electrode active material. The organic carbon source added during the coating had an amount $C_3$=2.3%, and $C_3 \times$carbon residue=1.56%.

Preparation of a Negative Electrode Plate

The negative electrode active material prepared above, styrene-butadiene rubber (SBR) as a binder, sodium carboxymethyl cellulose (CMC-Na) as a thickener, and carbon black (Super P) as a conductive agent, were mixed thoroughly at a weight ratio of 96.2:1.8:1.2:0.8 in an appropriate amount of deionized water to form a uniform negative electrode slurry; the negative electrode slurry was coated on the surface of a copper foil as a negative electrode current collector, and a negative electrode plate was obtained after drying, cold pressing, slitting, and cutting. The negative electrode plate had a compaction density of 1.5 $g/cm^3$ and an areal density of 110.0 $g/m^2$.

Preparation of a Positive Electrode Plate

Lithium nickel cobalt manganese ternary active material $LiNi_{0.5}Co_{0.2}Mn_{0.3}O_2$(NCM523), carbon black (Super P) as a conductive agent, and PVDF as a binder were mixed thoroughly at a weight ratio of 94:3:3 in an appropriate amount of N-methylpyrrolidone (NMP) to form a uniform positive electrode slurry; the positive electrode slurry was coated on the surface of an aluminum foil as a positive electrode current collector, and a positive electrode plate was obtained after drying, cold pressing, slitting, and cutting. The positive electrode plate had a compaction density of 3.5 $g/cm^3$ and an areal density of 171.4 $g/m^2$.

Separator

PE film is selected as the separator.

Preparation of an Electrolyte

Ethylene carbonate (EC), ethyl methyl carbonate (EMC), and diethyl carbonate (DEC) were mixed at a volume ratio of 1:1:1, and then the fully dried lithium salt $LiPF_6$ was uniformly dissolved in the solution to obtain an electrolyte, wherein $LiPF_6$ had a concentration of 1 mol/L.

Preparation of a Secondary Battery

The positive electrode plate, the separator, and the negative electrode plate were stacked in order, and a reference electrode was added between the separator and the negative plate (wherein the reference electrode was used for the subsequent performance testing of the battery sample, and could be selected as lithium sheet, lithium metal wire, etc.; moreover, the reference electrode should be separated via the separator to prevent the contact with either side of the positive and negative electrode plates); an electrode assembly was obtained after winding; the electrode assembly was packaged in an outer package, the above-mentioned electrolyte was added, and a secondary battery was obtained after steps including packaging, standing, formation, and aging.

The preparation methods of Examples 2 to 20 and Comparative Examples 1 to 6 were similar to that of Example 1, except that the composition of the negative electrode plate and product parameters were adjusted. The different product parameters might refer to Table 1 to Table 2 for detail.

II. Test of Battery Performance (1) Test of Fast Charging Performance

At 25° C., the secondary batteries prepared in the examples and comparative examples were charged to 4.3V at a constant current of 1 C (that is, the current under theoretical capacity was completely discharged within 1 h), then were charged to a current of 0.05 C at a constant voltage and allowed to stand for 5 min, and then were discharged to 2.8V at a constant current of 1 C; the actual capacity was recorded as $C_0$.

Then the batteries were charged sequentially at constant currents of 0.5 $C_0$, 1 $C_0$, 1.5 $C_0$, 2 $C_0$, 2.5 $C_0$, 3 $C_0$, 3.5 $C_0$, 4 $C_0$, 4.5 $C_0$ to the negative electrode cut-off potential of 4.3V or 0V (whichever reached first); after each charging, the batteries should be discharged to 2.8V at 1 $C_0$, the corresponding negative electrode potentials when the batteries were charged to 10%, 20%, 30% . . . 80% of SOC (State of Charge) at different charge rates were recorded, and the rate-negative electrode potential curves were plotted under different SOCs and were linearly fitted; afterwards, the corresponding charge rates under different SOC states when the negative electrode potential was 0V were obtained, and the charge rates were the charging window under the SOC state, recorded as $C_{20\%\ SOC}$, $C_{30\%\ SOC}$, $C_{40\%\ SOC}$, $C50\%\ SOC$, $C_{60\%\ SO}\ C$, $C_{70\%\ SOC}$, and $C_{80\%\ SOC}$ respectively. According to formula $(60/C_{20\%\ SOC}+60/C_{30\%\ SOC}+60/C_{40\%\ SOC}+60/C_{50\%\ SOC}+60/C_{60\%\ SOC}+60/C_{70\%\ SOC}+60/C_{80\%\ SOC}) \times 10\%$, the charging time T (min) for the battery to charge from 10% SOC to 80% SOC could be calculated. The shorter the time was, the better the fast charging performance of the battery would be.

(2) Test for Cycle Performance

At 25° C., the secondary batteries prepared in the examples and comparative examples were charged to 4.3V at a constant current of 1 C, then were charged to a current of 0.05 C at a constant voltage and allowed to stand for 5 minutes, and then were discharged to 2.8V at a constant current of 1 C, the initial capacity was recorded as Co. Then the charging and discharging cycles were performed according to the above-mentioned process, the discharge capacity $C_n$ of each cycle was recorded, and the number of cycles were recorded until the cycle capacity retention rate ($C_n/C_0 \times 100\%$) is 80%.

(3) Test for Storage Performance

At 25° C., the secondary batteries prepared in the examples and comparative examples were discharged to 2.8V at a constant current of 1.0 C; then were charged to 4.3V at a constant current of 1.0 C, and then were charged to a current of 0.05 C at a constant voltage, the batteries now were fully charged, i.e. reached 100% SOC. The fully charged batteries were allowed to stand for 5 minutes, afterwards, they were discharged to 2.8V at a constant current of 1.0 C, now the discharge capacity was the actual capacity of the battery at 1 C/1 C, recorded as $C_0$.

Then, at 25° C., the batteries were charged to 4.3V at a constant current of 1 $C_0$, and were further charged to a current of 0.05 C at constant voltage, which means the batteries were fully charged. The fully charged batteries were stored at 60° C. The batteries were taken out every 30 days, and were discharged to 2.8V at a constant current of 1 $C_0$ at 25° C., then were charged to 4.3V at a constant current of 1 $C_0$, and then were further charged to a current of 0.05 C at constant voltage, and were allowed to stand for 5 minutes, afterwards, they were discharged to 2.8V at a constant current of 1.0 C, now the discharge capacity was the reversible capacity after a storage period, recorded as $C_n$; the capacity retention rate of this storage period is $C_n/C_0 \times 100\%$. The storage test was repeated until the capacity retention rate reached 80%, when the storage time (days) was recorded.

TABLE 1

| No. | Coke raw materials | Parameters for preparation | | | | | | | | Negative electrode active material Particle size uniformity | Performances of batteries | | |
|---|---|---|---|---|---|---|---|---|---|---|---|---|---|
| | | Volatile content of coke raw materials $C_1$ | Particle size uniformity of precursor $U_1$ | Amount of binder used during pelleting $C_2$ | A1 | Particle size uniformity of artificial graphite $U_2$ | Amount of organic carbon source used during coating $C_3$ | $C_3 \times$ carbon residue rate | A2 | | Fast charging performance (min) | Cycle performance (cycles) | Storage performance (days) |
| Example 1 | Petroleum green coke | 7.0% | 0.24 | 2.5% | 39.6% | 0.26 | 2.3% | 1.56% | 46.3% | 0.27 | 21.5 | 1981 | 600 |
| Example 2 | Petroleum green coke | 7.0% | 0.38 | 6.0% | 34.2% | 0.33 | 2.6% | 1.77% | 47.3% | 0.31 | 18.5 | 2530 | 690 |
| Example 3 | Petroleum green coke | 7.0% | 0.44 | 6.3% | 30.2% | 0.40 | 3.0% | 2.04% | 40.8% | 0.38 | 19.3 | 2332 | 780 |
| Example 4 | Petroleum green coke | 7.0% | 0.49 | 8.0% | 30.6% | 0.46 | 3.5% | 2.38% | 40.2% | 0.43 | 20.2 | 2005 | 660 |
| Example 5 | Petroleum green coke | 7.0% | 0.44 | 2.5% | 21.6% | 0.43 | 3.0% | 2.04% | 29.1% | 0.40 | 20.6 | 1830 | 840 |
| Example 6 | Petroleum green coke | 7.0% | 0.44 | 2.5% | 21.6% | 0.43 | 3.5% | 2.38% | 30.2% | 0.38 | 18.5 | 2065 | 690 |
| Example 7 | Petroleum green coke | 5.0% | 0.40 | 8.0% | 32.5% | 0.35 | 2.6% | 1.77% | 44.6% | 0.33 | 19.3 | 2331 | 690 |
| Example 8 | Petroleum green coke | 7.0% | 0.38 | 6.0% | 34.2% | 0.33 | 2.5% | 1.70% | 47.0% | 0.32 | 21 | 2469 | 630 |
| Example 9 | Petroleum green coke | 9.0% | 0.41 | 6.0% | 36.6% | 0.37 | 2.2% | 1.50% | 46.5% | 0.35 | 20.9 | 2346 | 570 |
| Example 10 | Petroleum green coke | 12.0% | 0.34 | 2.6% | 42.9% | 0.31 | 2.2% | 1.50% | 54.2% | 0.30 | 20.6 | 2178 | 600 |
| Example 11 | Petroleum needle coke | 7.0% | 0.36 | 6.0% | 36.1% | 0.33 | 2.6% | 1.77% | 47.3% | 0.31 | 22.9 | 2201 | 750 |
| Example 12 | Petroleum needle coke + Petroleum green coke | 10.0% | 0.38 | 5.0% | 39.5% | 0.34 | 2.6% | 1.77% | 51.8% | 0.31 | 21.2 | 2324 | 720 |
| Example 13 | Petroleum calcined coke | 1.0% | 0.44 | 13.0% | 31.8% | 0.40 | 2.6% | 1.77% | 41.5% | 0.37 | 19.3 | 2198 | 750 |
| Comparative example 1 | Petroleum green coke | 7.0% | 0.18 | 1.0% | 44.4% | 0.23 | 1.0% | 0.68% | 39.1% | 0.24 | 24.6 | 801 | 570 |
| Comparative example 2 | Petroleum green coke | 7.0% | 0.53 | 9.0% | 30.2% | 0.48 | 3.5% | 2.38% | 40.6% | 0.46 | 23.9 | 915 | 540 |
| Comparative example 3 | Petroleum green coke | 7.0% | 0.24 | 8.0% | 62.5% | 0.51 | 2.3% | 1.56% | 33.9% | 0.46 | 25.3 | 672 | 300 |
| Comparative example 4 | Petroleum green coke | 7.0% | 0.49 | 2.5% | 19.4% | 0.48 | 3.5% | 2.38% | 27.1% | 0.47 | 26.1 | 540 | 630 |
| Comparative example 5 | Petroleum green coke | 7.0% | 0.24 | 1.0% | 33.3% | 0.26 | 7.0% | 4.76% | 57.7% | 0.48 | 24.3 | 616 | 210 |
| Comparative example 6 | Petroleum green coke | 7.0% | 0.49 | 9.0% | 32.7% | 0.46 | 1.8% | 1.22% | 38.7% | 0.46 | 25.6 | 470 | 690 |

TABLE 2

| Nos. | Coke raw materials | Volatile content of coke raw materials | Particle size uniformity of precursor $U_1$ | Amount of binder used during pelleting $C_2$ | A1 | Particle size uniformity of artificial graphite $U_2$ | Amount of organic carbon source used during coating $C_3$ |
|---|---|---|---|---|---|---|---|
| Example 14 | Petroleum Green coke | 7.0% | 0.55 | 6.2% | 24.0% | 0.36 | 3.3% |
| Example 15 | Petroleum Green coke | 7.0% | 0.48 | 5.7% | 26.5% | 0.35 | 2.8% |
| Example 16 | Petroleum Green coke | 7.0% | 0.43 | 4.3% | 26.3% | 0.35 | 3.2% |
| Example 17 | Petroleum Green coke | 7.0% | 0.35 | 4.6% | 33.1% | 0.33 | 2.9% |
| Example 18 | Petroleum Green coke | 7.0% | 0.33 | 2.2% | 27.9% | 0.35 | 3.3% |
| Example 19 | Petroleum Green coke | 7.0% | 0.24 | 2.1% | 37.9% | 0.30 | 2.9% |
| Example 20 | Petroleum Green coke | 7.0% | 0.16 | 0.8% | 48.8% | 0.26 | 2.1% |

| | Parameters for preparation | | Negative electrode active material | | Performances of batteries | | |
|---|---|---|---|---|---|---|---|
| Nos. | $C_3 \times$ carbon residue rate | A2 | Particle size uniformity | Particle size specific surface area ($m^2/g$) | Fast charging performance (min) | Cycle performance (cycles) | Storage performance (days) |
| Example 14 | 2.24% | 45.8% | 0.34 | 0.68 | 21.5 | 2145 | 630 |
| Example 15 | 1.90% | 44.3% | 0.34 | 0.62 | 20.7 | 2217 | 690 |
| Example 16 | 2.2% | 41.4% | 0.34 | 0.51 | 18.9 | 2401 | 690 |
| Example 17 | 2.0% | 43.9% | 0.34 | 0.46 | 18.7 | 2524 | 720 |
| Example 18 | 2.2% | 35.7% | 0.34 | 0.42 | 19.5 | 2430 | 660 |
| Example 19 | 1.97% | 40.0% | 0.34 | 0.37 | 20.5 | 2268 | 660 |
| Example 20 | 1.43% | 38.1% | 0.34 | 0.22 | 21.7 | 2196 | 600 |

In Table 1 and Table 2, $A1=(C_1+C_2)/U_1 \times 100\%$; and $A_2=(C_1+C_2+C_3)/U_2 \times 100\%$.

By the comparison of Examples 1 to 13 and Comparative Examples 1 to 6, it could be seen that, since the negative electrode active material of the examples according to the present application comprised a core and a coating layer covering a surface of the core, wherein the core comprised artificial graphite, the coating layer comprised amorphous carbon, and the particle size uniformity of the negative electrode active material was controlled within certain range, the secondary battery using the same could have higher energy density, and simultaneously could have higher fast charging performance, long cycle life and good high temperature storage performance.

The negative electrode active materials of Comparative Examples 1 to 6 did not satisfy the specific certain range of the particle size uniformity, and thus the secondary battery using the same had worse fast charging performance and cycle performance, and even had reduced storage performance.

From the results of Examples 14-20, it could be seen that, under the condition that the particle size specific surface area of the negative electrode active material was within an appropriate range, the fast charging performance, cycle life, and high-temperature storage performance of the battery could be further improved.

Described above are merely specific embodiments of the present application, but the protection scope of the present application is not limited to this. Any skilled person who is familiar with this art could readily conceive of various equivalent modifications or substitutions within the disclosed technical scope of the present application, and these modifications or substitutions shall fall within the protection scope of the present application. Therefore, the protection scope of the present application shall be subject to the protection scope of the claims.

What is claimed is:

1. A method for preparing a negative electrode active material comprising a core and a coating layer covering a surface of the core, comprising the following steps:
   a) providing a coke raw material, wherein the coke raw material has a volume average particle size $D_v50$ of from 6 μm to 12 μm, and the coke raw material has a volatile content $C_1$ satisfying $1\% \leq C_1 \leq 12\%$;
   b) shaping and grading the coke raw material to obtain a precursor, wherein the precursor has a particle size uniformity $U_1$ satisfying $0.2 \leq U_1 \leq 0.5$;
   c) granulating the precursor, during which a binder is added in an amount of $C_2$, wherein $C_1$, $C_2$ and $U_1$ satisfy $21\% \leq (C_1+C_2)/U_1 \times 100\% \leq 50\%$;
   d) graphitizing the granulated product at a temperature of from 2800° C. to 3200° C. to obtain an artificial graphite, wherein the artificial graphite has a particle size uniformity $U_2$ satisfying $0.22 \leq U_2 \leq 0.48$; and
   e) coating the artificial graphite with an organic carbon source, performing heat treatment to form an amorphous carbon coating layer on at least a part of the surface of the artificial graphite, to obtain the negative electrode active material, wherein the organic carbon source added during forming the coating layer has an amount $C_3$, and wherein $C_3$, $C_1$, $C_2$ and $U_2$ satisfy $20\% \leq (C_1+C_2+C_3)/U_2 \times 100\% \leq 55\%$, and $1.5\% \leq C_3 \times$ carbon residue rate $\leq 2.5\%$,
   wherein the core comprises artificial graphite, the coating layer comprises amorphous carbon, and the negative electrode active material has a particle size uniformity of from 0.25 to 0.45.

2. The method according to claim 1, wherein the coke raw material comprises one or more of petroleum-based non-needle coke and petroleum-based needle coke.

3. The method according to claim 1, wherein the coke raw material comprises petroleum green coke.

4. The method according to claim 1, wherein the particle size uniformity of the negative electrode active material is from 0.3 to 0.4.

5. The method according to claim 1, wherein the negative electrode active material has a particle size specific surface area of from 0.3 m²/g to 0.65 m²/g.

6. The method according to claim 1, wherein the negative electrode active material satisfies $0.8 \leq (D_v90-D_v10)/D_v50 \leq 1.6$.

7. The method according to claim 1, wherein the negative electrode active material comprises secondary particles, and wherein the secondary particles have a number proportion of ≥30% in the negative electrode active material.

8. The method according to claim 1, wherein the negative electrode active material further satisfies one or more of the following conditions from (1) to (4):
   (1) the negative electrode active material has a volume particle size distribution $D_v10$ satisfying 5 μm ≤ $D_v10$ ≤ 10 μm; the negative electrode active material has a volume average particle size $D_v50$ satisfying 8 μm ≤ $D_v50$ ≤ 16 μm;
   (2) the negative electrode active material has a graphitization degree of from 91.0% to 96.0%;
   (3) the negative electrode active material has a gram capacity of from 345 mAh/g to 360 mAh/g; and
   (4) the negative electrode active material has a tap density of from 0.8 g/cm³ to 1.2 g/cm³.

9. The method according to claim 1, wherein the particle size uniformity of the negative electrode active material is from 0.31 to 0.38.

10. The method according to claim 1, wherein the negative electrode active material has a particle size specific surface area of from 0.4 m²/g to 0.55 m²/g.

11. The method according to claim 1, wherein the negative electrode active material satisfies $0.9 \leq (D_v90-D_v10)/D_v50 \leq 1.4$.

12. The method according to claim 1, wherein the negative electrode active material comprises secondary particles, and wherein the secondary particles have a number proportion of ≥50% in the negative electrode active material.

13. The method according to claim 1, wherein the negative electrode active material further satisfies one or more of the following conditions from (1) to (4):
   (1) the negative electrode active material has a volume particle size distribution $D_v10$ satisfying 6.0 μm ≤ $D_v10$ ≤ 8.0 μm; the negative electrode active material has a volume average particle size $D_v50$ satisfying 10 μm ≤ $D_v50$ ≤ 14 μm;
   (2) the negative electrode active material has a graphitization degree of from 92.0% to 94.5%;
   (3) the negative electrode active material has a gram capacity of from 348 mAh/g to 355 mAh/g; and
   (4) the negative electrode active material has a tap density of from 0.95 g/cm³ to 1.05 g/cm³.

14. The method according to claim 1, wherein the coke raw material has a volatile content $C_1$ satisfying $5\% \leq C_1 \leq 9\%$.

15. The method according to claim 1, wherein $C_1$, $C_2$ and $U_1$ satisfy $31\% \leq (C_1+C_2)/U_1 \times 100\% \leq 35\%$.

* * * * *